US012128699B2

(12) United States Patent
Wegzyn et al.

(10) Patent No.: US 12,128,699 B2
(45) Date of Patent: Oct. 29, 2024

(54) DIGITAL HEAT TRANSFER OF AN IMAGE

(71) Applicant: Scribe OpCo, Inc., Clearwater, FL (US)

(72) Inventors: Steve Wegzyn, Crystal River, FL (US); Gerard Krief, Tarpon Springs, FL (US)

(73) Assignee: SCRIBE OPCO, INC., Clearwater, FL (US)

( * ) Notice: Subject to any disclaimer, the term of this patent is extended or adjusted under 35 U.S.C. 154(b) by 7 days.

(21) Appl. No.: 17/938,852

(22) Filed: Oct. 7, 2022

(65) Prior Publication Data

US 2023/0026933 A1 Jan. 26, 2023

Related U.S. Application Data

(62) Division of application No. 17/215,478, filed on Mar. 29, 2021.

(51) Int. Cl.

*B41M 5/382* (2006.01)
*B41F 15/40* (2006.01)
*B41F 27/00* (2006.01)
*B41M 3/12* (2006.01)
*B44C 1/17* (2006.01)

(52) U.S. Cl.

CPC ............. *B41M 5/382* (2013.01); *B41F 15/40* (2013.01); *B41F 27/005* (2013.01); *B41M 3/12* (2013.01); *B44C 1/172* (2013.01)

(58) Field of Classification Search

CPC ......... B41F 15/40; B41F 27/005; B41M 3/12; B44C 1/172

See application file for complete search history.

(56) References Cited

U.S. PATENT DOCUMENTS

| | | | | |
|---|---|---|---|---|
| 2002/0098329 A1* | 7/2002 | Abrams | D06Q 1/14 428/204 |
| 2004/0032477 A1* | 2/2004 | Baker, Jr. | G03G 8/00 347/102 |
| 2019/0378438 A1* | 12/2019 | Penrose | C09D 11/102 |
| 2020/0001620 A1* | 1/2020 | Lux | B41J 3/4075 |

FOREIGN PATENT DOCUMENTS

| | | | | |
|---|---|---|---|---|
| CN | 102785499 | * 11/2012 | |
| CN | 113453911 A | * 9/2021 | B32B 7/06 |
| DE | 102018120815 A1 | * 10/2019 | |
| WO | WO-2019232459 A1 | * 12/2019 | B41J 2/2114 |

* cited by examiner

*Primary Examiner* — Christopher E Mahoney
*Assistant Examiner* — Marissa Ferguson-Samreth
(74) *Attorney, Agent, or Firm* — Shumaker, Loop & Kendrick, LLP

(57) ABSTRACT

An applicator for transferring an indicia to a substrate includes an ink layer forming the indicia. A white layer is disposed on the ink layer. An adhesive layer is disposed on the white layer. The adhesive layer is configured to adhere the ink layer and the white layer to the substrate.

13 Claims, 9 Drawing Sheets

DIGITAL HEAT TRANSFER OF AN IMAGE

CROSS-REFERENCE TO RELATED APPLICATIONS

Figure 1:
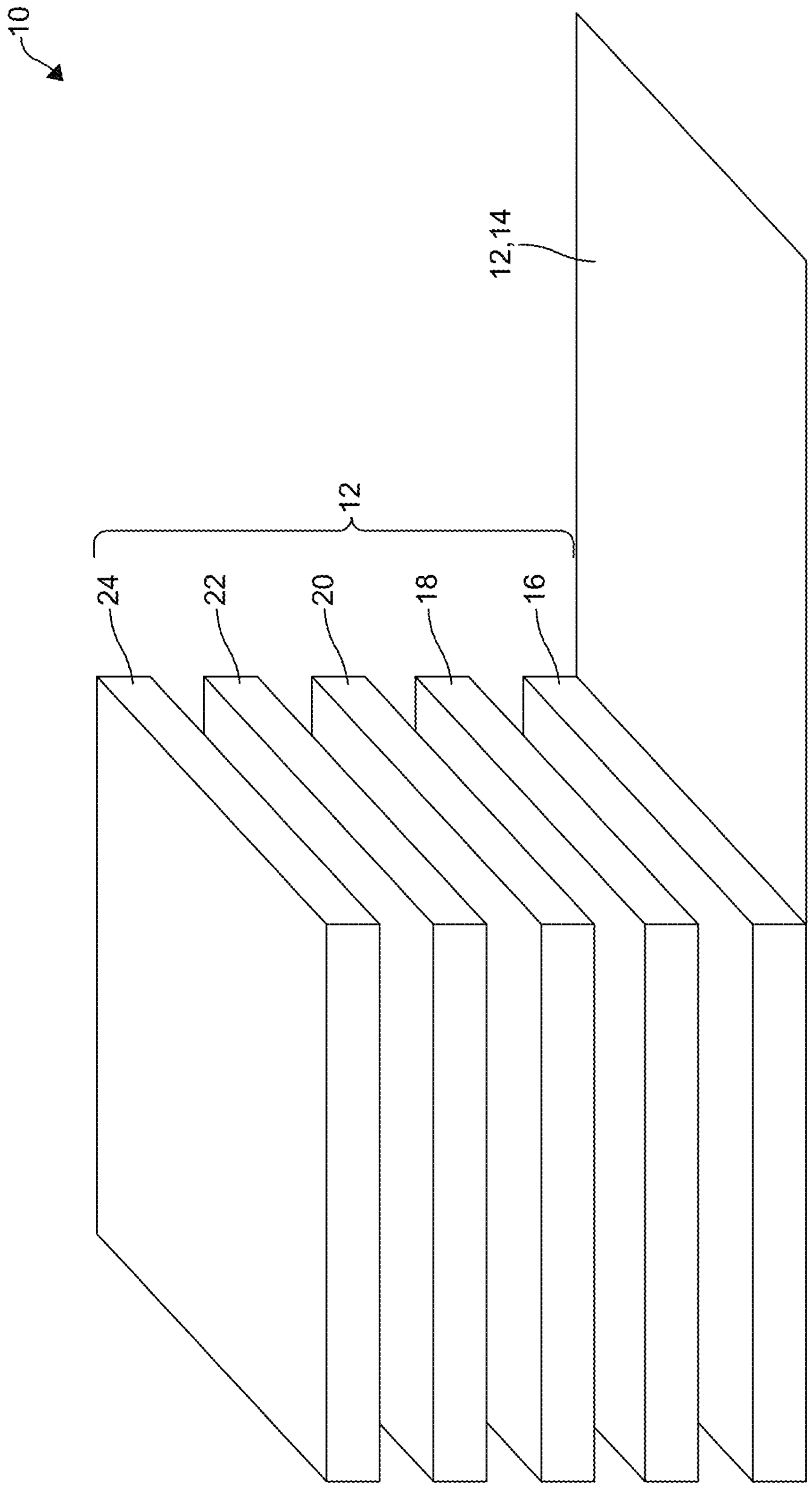

This patent application is a divisional patent application of U.S. patent application Ser. No. 17/215,478 filed on Mar. 29, 2021, the entire disclosure of which is hereby incorporated herein by reference.

FIELD

The invention relates to printing on a substrate, and particularly to a device, process, and system for digitally transferring color indicia and heat transferrable adhesive onto a textile substrate.

BACKGROUND

Various types of printing machines and processes exist to transfer indicia or design images containing various colors onto substrates or articles formed from textile, paper, plastic, or other materials. For certain applications, it is desired for the printed indicia to include a background of a certain color, such as white, to ensure precise rendering of desired colors of the indicia. A white background is desired for indicia having a great number of detail. Examples of known processes for transferring indicia to substrates are screen printing, direct digital printing to the substrate, or hybrid printing which involves both screen printing and digital printing.

Typically, for screen printing processes, a multi-step or multi-stage process is employed. For example, rotary or carousel printing machines are known for use in screen printing processes. The substrate is transferred through multiple printing stations. Each printing station contains a printing head having a silkscreen frame holder for holding the silkscreen frame. The silkscreen frame positions and maintains a screen therein which is exposed to an image. The printing head may also have an ink dispenser that dispenses ink at one end of the silkscreen and a squeegee that is pulled across the silkscreen to evenly apply the ink to the substrate. In this arrangement, each of the silkscreens in the sequence commonly prints a different image on top of the previously printed image, and this subsequent image can be of a different color and design. After the substrates have rotated through all the desired print heads, the final desired indicia or design is transferred to the substrate. However, this process requires multiple steps and applies the ink directly to the substrate, and does not employ a white background or layer, and may not necessarily be desired for printing detailed indicia.

Direct digital printing is typically a process requiring fewer steps than the screen printing process, wherein the indicia, with photorealistic quality and detail, is transferred directly to the material forming the substrate via ink. However, in order to maintain a transferring of indicia in precision of color and detail, specific material, such as cotton, for example must be employed for the substrates. Additionally, lack of vibrancy of color and precision of detail may be undesireably realized when the substrate is not formed from a white color. Substrates having dark colors are especially undesireable to receive the printed indicia directly thereon via the direct printing process. Furthermore, direct digital printing onto the substrate is disadvantageous when larger volumes of products with printed substrates are required. The greater the number of printed substrates required, the more costly the direct digital printing becomes compared to screen printing processes.

Hybrid printing employs a screen printed white underbase or layer to substrates of various materials and colors. The white layer is applied to the substrate prior to other indicia being transferred. After screen printing the white ink onto the substrate, the substrate is transferred to a digital printing print head. The hybrid printing is more efficient than a direct digital printing process due to the screen printed white layer. Also, the white layer reduces digital ink costs because the white layer costs significantly less than white digital printing ink. However, hybrid printing is disadvantageous because often the digital ink is transferred to undried or uncured screen printing ink in a wet-to-wet manner and requires a dryer. Additionally, the process still requires multiple steps including both the screen printing step and the digital printing step. Furthermore, while the hybrid printing process is faster and more cost effective when printing on substrates in larger volumes (i.e. 50-400 substrates) than volumes for direct digital printing, the screen printing process may still be the most cost effective way of printing on substrates on even higher volumes such as greater than 400 substrates. Also, the screen printed white layer may not be desired for aesthetic or comfort of wear reasons.

Therefore, it is desirable to include a system and method for ergonomically digitally printing ink onto articles with minimal production steps, wherein the system and method minimizes cost of production while maximizing production efficiency, volume of articles printed within a desired time interval, and photorealistic quality and precision.

SUMMARY

In accordance and attuned with the present disclosure a system and method of releasing an article from being attached to a pallet of the printing machine prior to removal from the printing machine, wherein the system and method minimizes cost of production and damage to the articles while maximizing production efficiency has surprisingly been discovered According to an embodiment of the instant disclosure, an applicator for transferring an indicia to a substrate includes an ink layer forming the indicia. A white layer is disposed on the ink layer. An adhesive layer is disposed on the white layer. The adhesive layer is configured to adhere the ink layer and the white layer to the substrate.

According to another embodiment of the disclosure, a process of transferring an indicia to a substrate is disclosed. The process includes a first print head selectively transferring a nonwhite color ink to a carrier film to form an ink layer visually displaying the indicia. A second print head prints a white color ink to the ink layer to form a white layer. A dispenser disposes an adhesive layer on the white layer.

According to yet another embodiment of the disclosure, a method of transferring an indicia to a substrate is disclosed. The method includes the steps of providing a carrier film formed from a flexible sheet of material and transferring ink from a first print head to the carrier film to form an ink layer containing the indicia. The method additionally includes the steps of curing the ink with a first heating element and transferring white ink from a second print head to the ink layer to form a white layer, wherein the white ink is liquid or semi-liquid. The method further includes the steps of dispensing an adhesive layer on the white ink and curing the adhesive layer with a second heating element, wherein the carrier film, the ink layer, the white layer, and the adhesive layer form an applicator.

DRAWINGS

The above, as well as other objects and advantages of the invention, will become readily apparent to those skilled in the art from reading the following detailed description of an embodiment of the invention when considered in the light of the accompanying drawing which:

FIG. 1 is a schematic illustration of layers of an applicator according to an embodiment of the instant disclosure; and FIGS. 2A-9 schematically illustrate top perspective views of a process and method steps for forming the applicator of FIG. 1 and transferring an indicia from the applicator to a substrate according to an embodiment of the instant disclosure.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

"A" and "an" as used herein indicate "at least one" of the item is present; a plurality of such items may be present, when possible. Spatially relative terms, such as "front," "back," "inner," "outer," "bottom," "top," "horizontal," "vertical," "upper," "lower," "side," "above," "below," "beneath," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The disclosure relates to screen printing articles on a rotary or carousel printing machine and removing the articles therefrom. Examples of rotary screen printing machines can be found in U.S. Pat. Appl. Pub. No. 2007/0240589 and U.S. Pat. No. 6,101,938, the disclosures of which are incorporated herein by reference in their entirety. However, it is understood, the systems and methods described herein relating to release and removal of articles from the printing machine can be employed with alternate printing machines or other rotary machines or devices.

Figure 8:
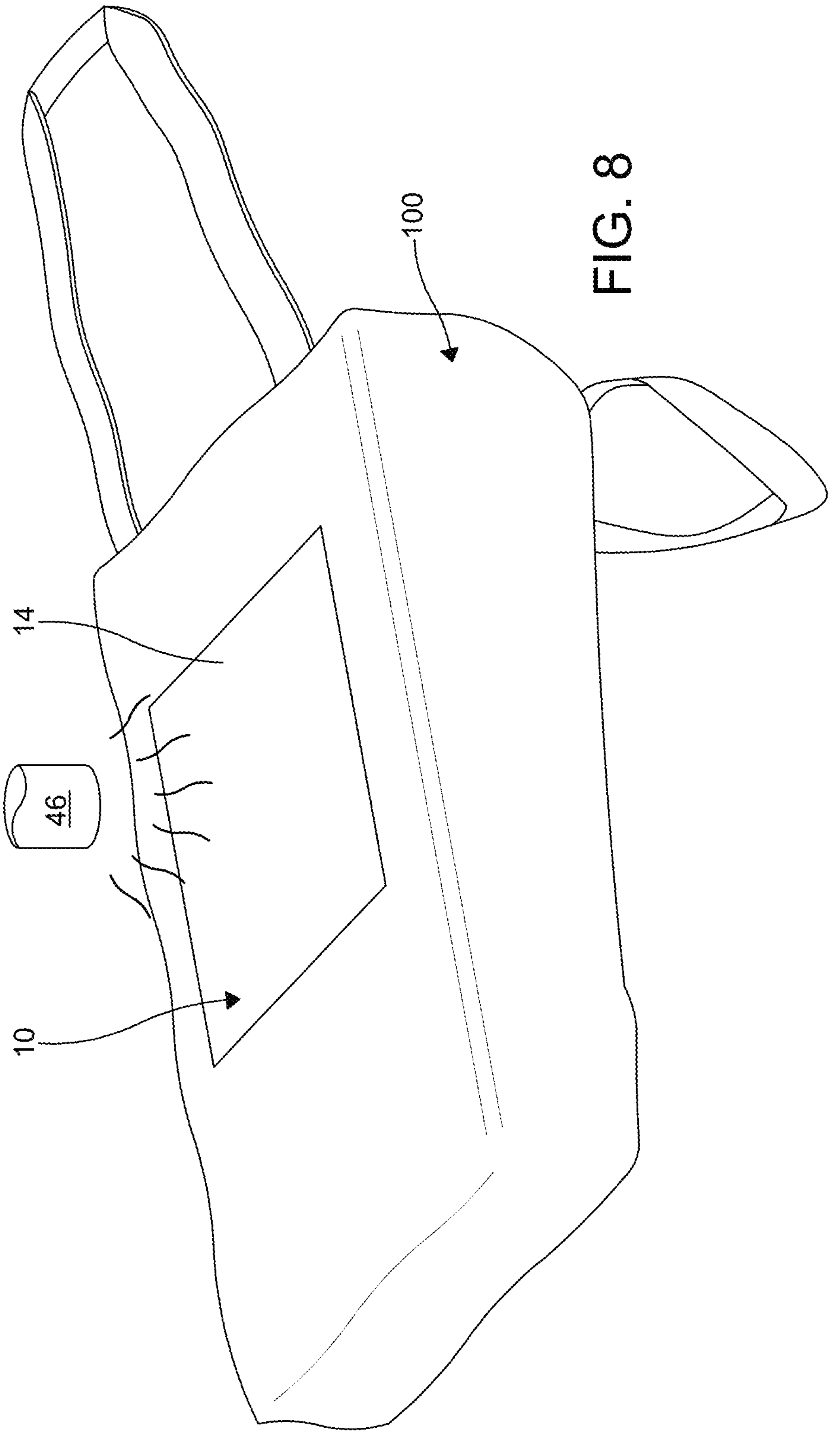
Figure 9:
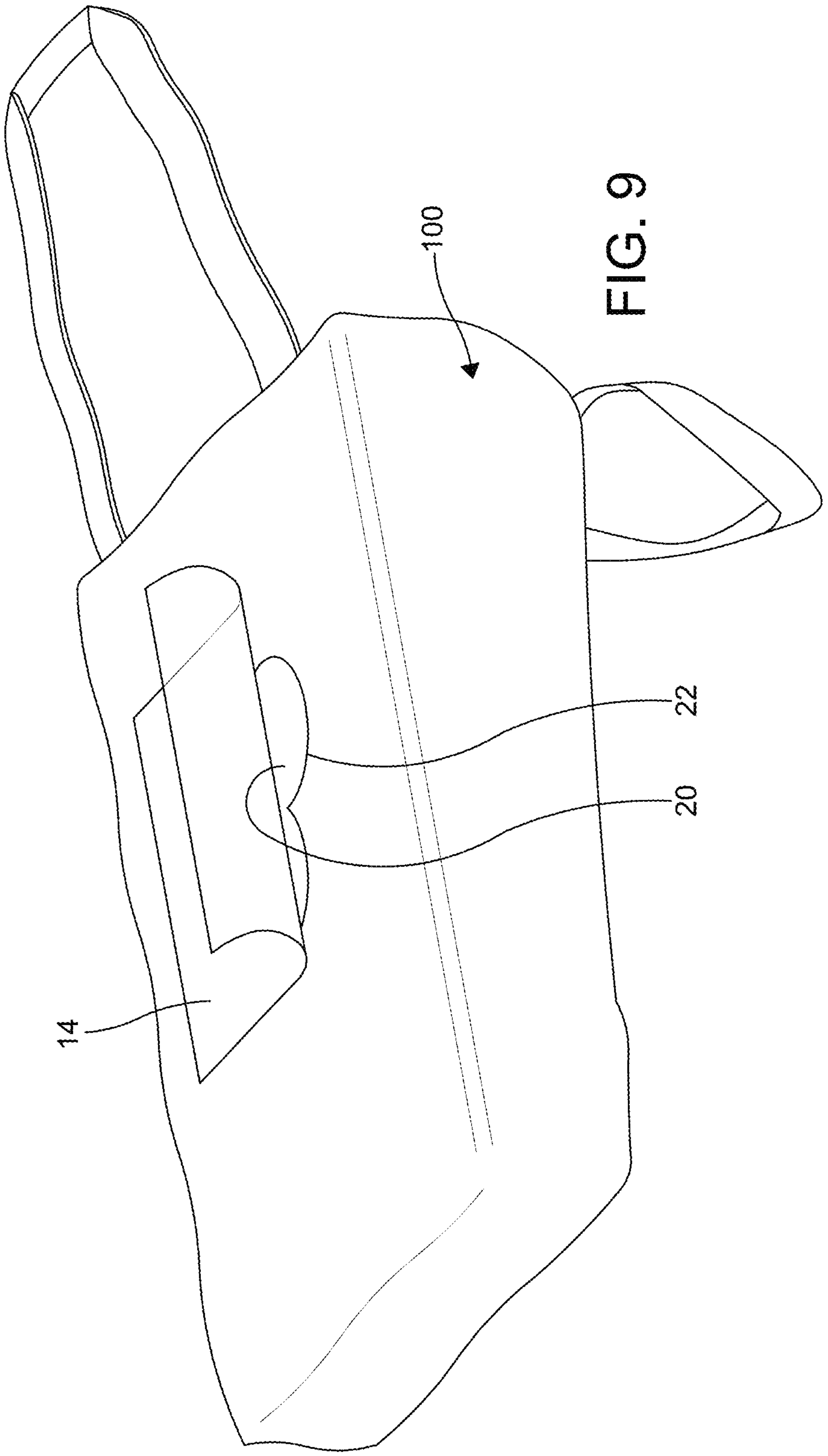

FIG. 1 illustrates an applicator 10 according to an embodiment of the present invention. The applicator 10 is configured for applying an indicia to a substrate 100 as shown in FIGS. 8 and 9 and which will be described in further detail hereinbelow. The applicator 10 includes layers 12 of substance. The layers 12 include a carrier film 14, a release layer 16, a lacquer layer 18, an ink layer 20, a white layer 22, and an adhesive layer 24.

The carrier film 14 is a flexible thin planar sheet of material. For example, the carrier film 14 is a polyester material with a thickness in a range of about 1-2 mils. However, the carrier film 14 can be a polyvinyl chloride material, a polypropylene material, a polyethylene material, a polyethylene terephthalate material, a foil material, a coated paper material, a combination thereof, or any other thin flexible material configured to easily transfer ink thereon and release ink therefrom. Additionally, the carrier film 14 can have thicknesses greater than or less than a range of 1-2 mils. The carrier film 14 is configured to support the remaining ones of the layers 12 during sequential process steps. The release layer 16 is formed from a pressure sensitive coating such as RVG001484 TACTILE COAT manufactured by ACTEGA of Delran, New Jersey. However, the release layer 16 can be formed from any material permitting the carrier film 14 to be easily released from the applicator 10 when the applicator 10 is subjected to heat.

The lacquer layer 18 is an ultraviolet (UV) coating such as ACTEGA® Tactile UV coating, for example. However, the lacquer layer 18 can be any material configured to protect the ink layer 20 when the ink layer 20 is transferred to the substrate 100. The lacquer layer 18 is not damaged or otherwise manipulated when the applicator 10 is subjected to the heat. The release layer 16 and the lacquer layer 18 are applied to the carrier film 14 during or after the formation of the carrier film 14.

The ink layer 20 is applied to the carrier film 14 with the release layer 16 and lacquer layer 18. The ink layer 20 applies an indicia to the carrier film 14 with the release layer 16 and the lacquer layer 18. The indicia can be any letter, number, shape, color, image, drawing, insignia, design, or similar type of indicia. The ink layer 20 consists of nonwhite ink colors cyan, magenta, yellow, and black ink which can be applied alone or in combination with each other to achieve a desired color or shade. However, it is understood the ink layer 20 can consist of light cyan, light magenta, light yellow, or any other color or combination of colors as desired. Additionally, the ink layer 20 can consist of four colors, six colors, eight colors, twelve colors, or any number of colors that can be applied alone or in combination with each other as desired. The ink layer 20 is a cured layer, wherein a heating element such as a flash cure or spot dryer is employed to set, dry, or cure the ink layer 20.

The white layer 22 is a noncolor or white ink applied to the ink layer 20. One or two layers of the white ink can be applied to the ink layer 20. However, it is understood, more than two layers of the white layer 22 can be applied to the ink layer 20, if desired. When one layer of the white layer 22 is applied to the ink layer 20, the white ink is not cured, wherein the white ink is not dried and still in liquid or semi-liquid form. When two layers of the white layer 22 is applied to the ink layer 20, a first layer of the white ink is cured, wherein the first layer of the white layer 22 is dried or becomes solid and a second layer of the white ink is not cured, wherein the second layer of the white layer 22 is wet or liquid or semi-liquid. When more than two layers of the white layer 22 are applied to the ink layer 20, all but the last or the top layer of the white layer 22 are cured and the last layer of the white layer 22 is not cured.

The adhesive layer 24 is applied to the uncured white layer 22. For example, the adhesive layer 24 is a cured powder adhesive, wherein the powder adhesive is dried, heated, or otherwise formally attached to the uncured white layer 22. During the curing of the powder adhesive, the white layer 22 may also be cured. The adhesive layer 24 is configured to be adhered to the substrate 100 upon a heating of the applicator 10 when engaged to the substrate 100. For example, the adhesive layer 24 permits the layers 12 of the applicator 10, except for the carrier film 14, to transfer from the carrier film 14 to the substrate 100 during a heat application process. The adhesive layer 24 is formed from a fine, medium, or coarse polyester resin. However, it is understood the adhesive layer 24 can be formed from any other material. For example, the adhesive layer 24 can be formed from a liquid adhesive or glue, a hook and loop system, an adhesive film such as adhesive tape, or any other type of adhesive as desired.

Figure 2A:
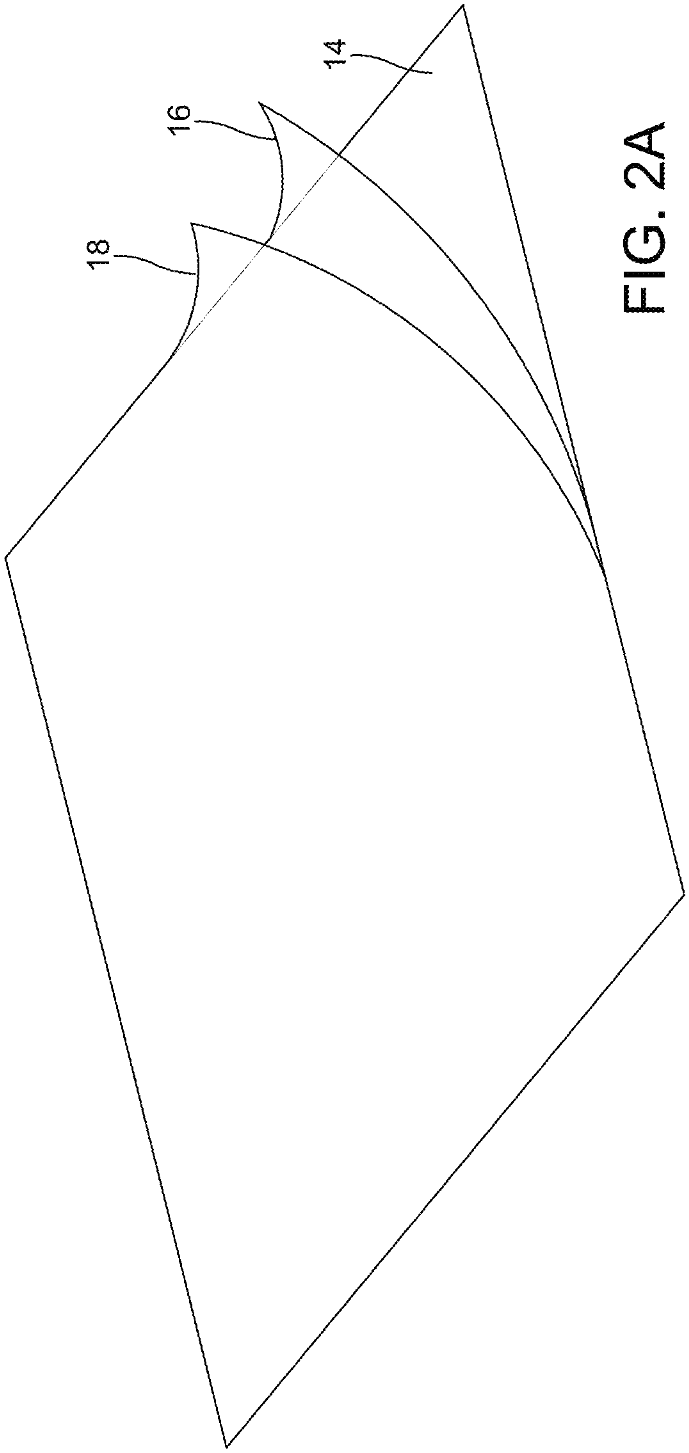
Figure 2B:
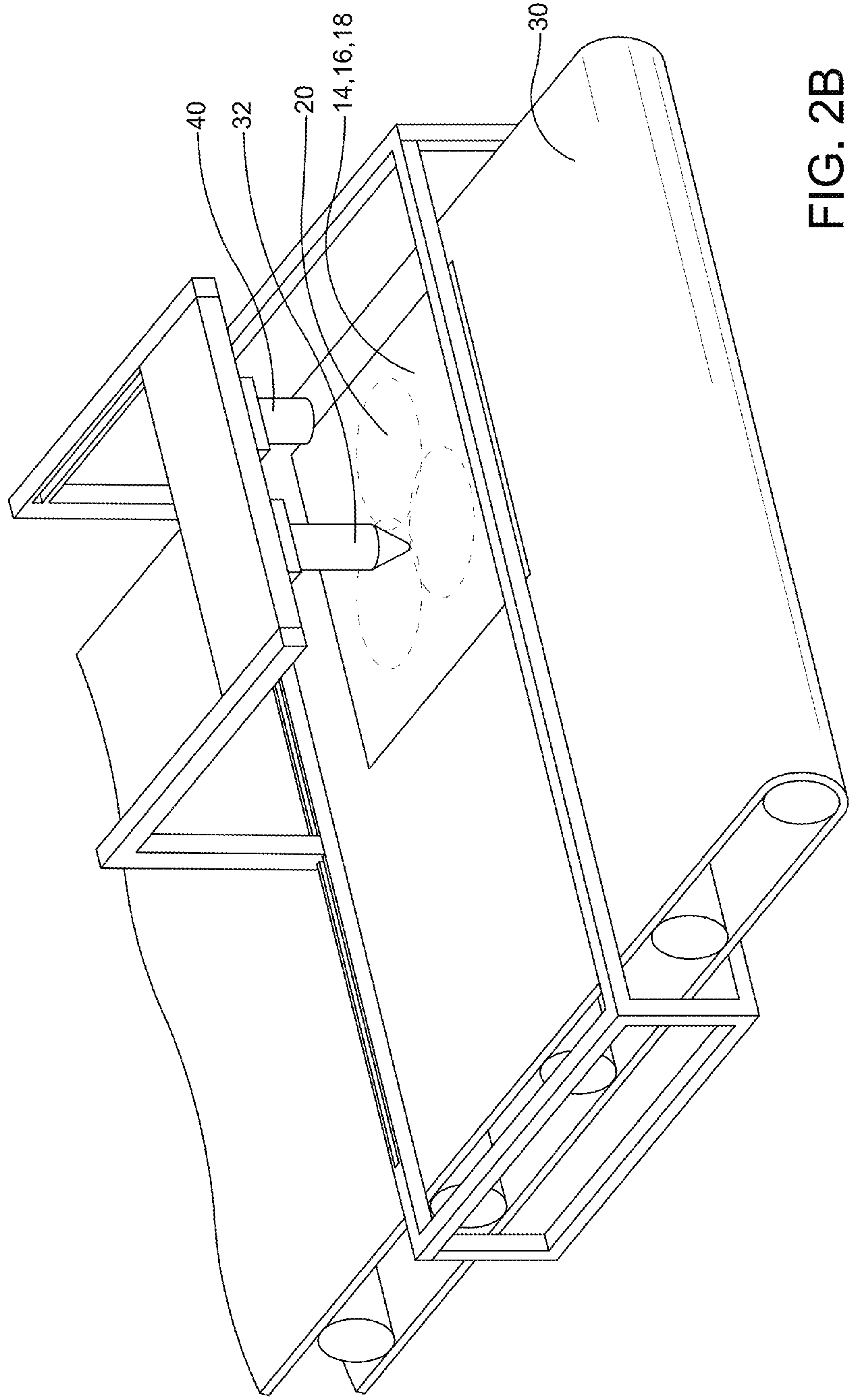

FIGS. 2A-9 illustrate the process to form the applicator 10 with the indicia and for applying the indicia (illustrated by dashed lines) on the substrate 100. In a first step, as shown in FIG. 2A, the release layer 16 is applied to the carrier film 14, then the lacquer layer 18 is applied to the release layer 16. In a second step, as shown in FIG. 2B, the carrier film 14 is positioned on a conveyor 30, for example, to be positioned beneath a print head 32. The conveyor 30 conveys the carrier film 14 to be properly positioned beneath the print head 32. The carrier film 14 can be positioned as desired beneath the print head 32 via coordinates through a computer system, for example, wherein the print head 32 applies the indicia to the carrier film 14 via printing computations once the carrier film 14 is beneath the print head 32. The print head 32 can be configured as any print head commonly known as desired. For example, the print head 32 can be a RICOH GEN 5 print head. Although, any print head can be employed as desired. As shown, the print head 32 applies the ink to the carrier film 14 to form the indicia.

Figure 3:
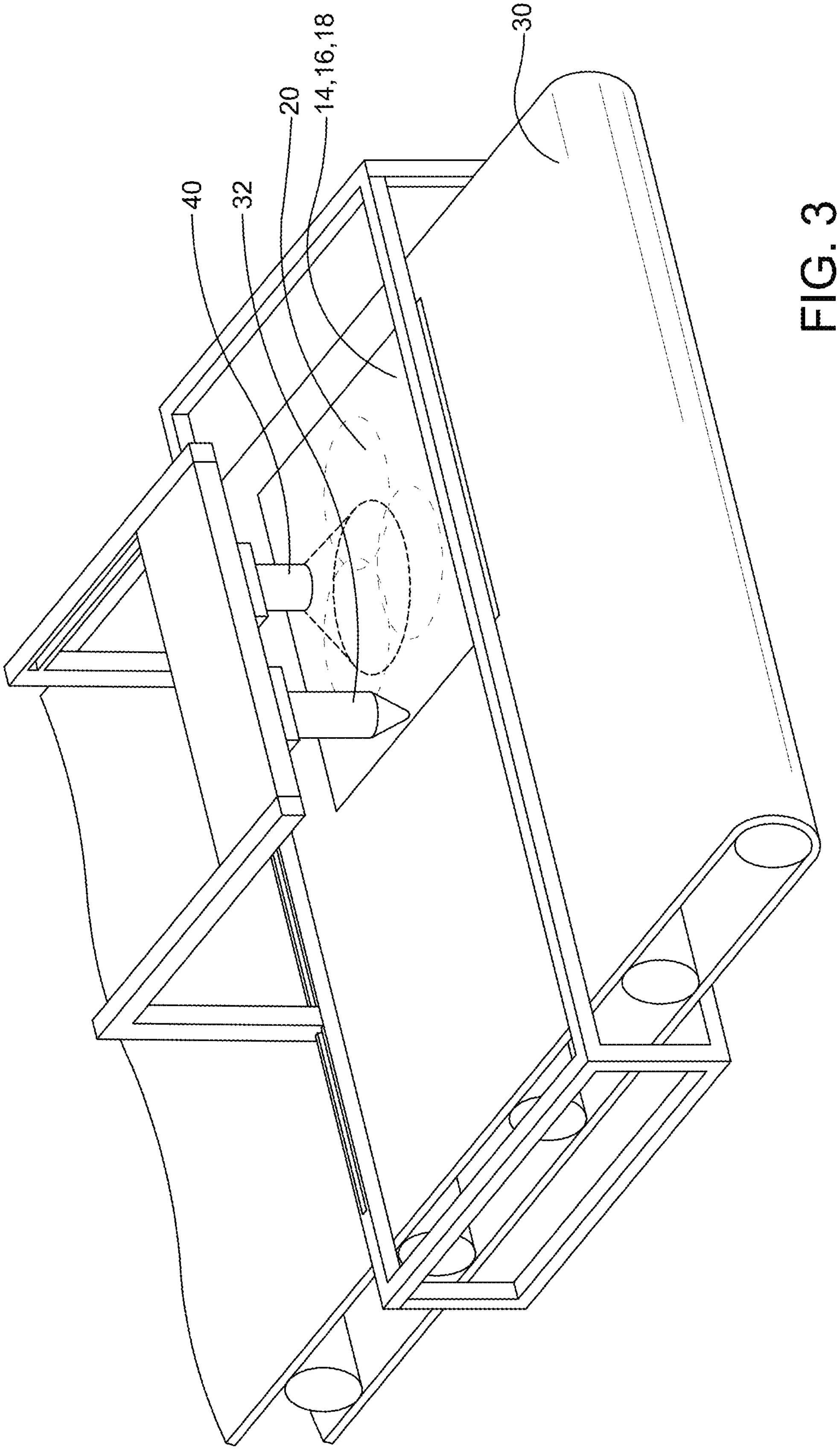

In a third step, shown in FIG. 3, during printing or after printing, a heating element 40 cures the ink to the carrier film 14. As a result, the white layer 22 can be applied to a solid or dried one of the ink layer 20. The heating element 40 can be a dryer, a flash curer, a lighting or ultra violet light, a kiln or oven, or any other type of element to heat and dry the ink layer 20.

Figure 4:
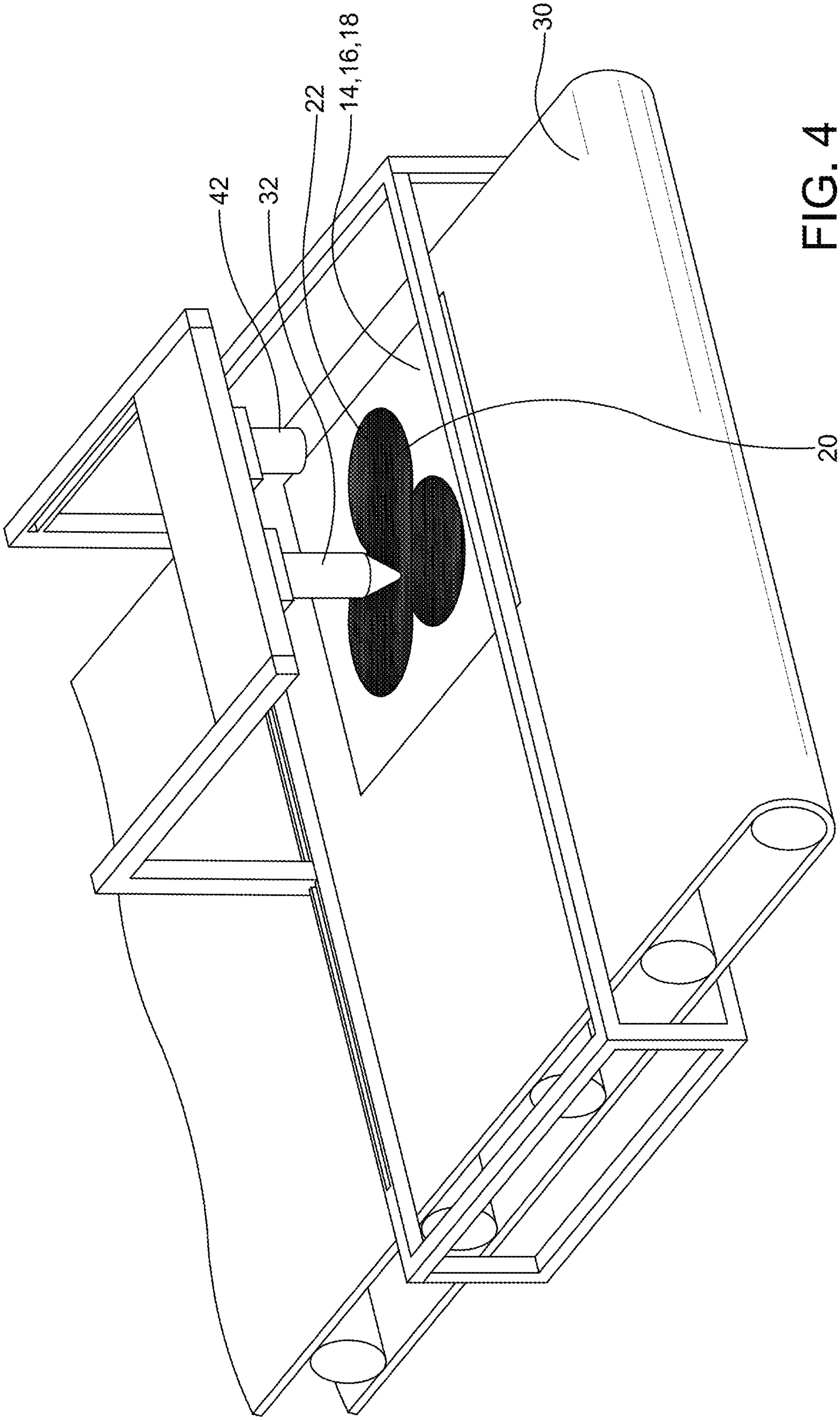

In a fourth step, as shown in FIG. 4, the white layer 22 (shown in all black for illustrative purposes) is applied to the ink layer 20. The white layer 22 maintains a contour which is substantially the same as the ink layer 20. For example, if the ink layer 20 has a circular outer contour, the white layer 22 will also have a circular outer contour. As a result, waste of the white ink used to form the white layer 22 is minimized. A white ink print head 34 is employed to apply the white later 22 to the ink layer 20. In the embodiment illustrated, the white ink print head 34 is separate from the print head 32 at a different area or station. However, in other embodiments, the white ink print head 34 can be integrated into the same housing as the print head 32 or at the same station or area as the print head 32.

One or more layers of the white layer 22 can be applied to the ink layer 20. Where more than one layer of the white layer 22 is applied to the ink layer 20, the last layer of the white layer 22 is not cured and the former ones of the layers of the white layer 22 are cured. Where only one layer of the white layer 22 is applied to the ink layer 20, the one layer of the white layer 22 is not cured, wherein the white layer 22 is wet or in liquid or semi-liquid form. To cure the layers 22, a heating element 42 is employed. The heating element 42 can be a dryer, a flash curer, a lighting or ultra violet light, a kiln or oven, or any other type of element to heat and dry the white layer 22.

The heating element 42 can be the same heating element as the heating element 40 employed to cure the ink layer 20. However, as shown, it is understood, the heating element 42 to cure the white layer 22 can be separate from the heating element 42 to cure the ink layer 20. Where the ink layer 20 and the white layer 22 are applied at the same station of the process, the print heads 32, 34 are integrated together in the same housing or adjacent each other. Where the ink layer 20 and the white layer 22 are applied at different stations of the process, the print heads 32, 34 are spaced from each other and the carrier film 14 can be transferred between the stations such as by a conveyor or robot, for example.

Figure 5:
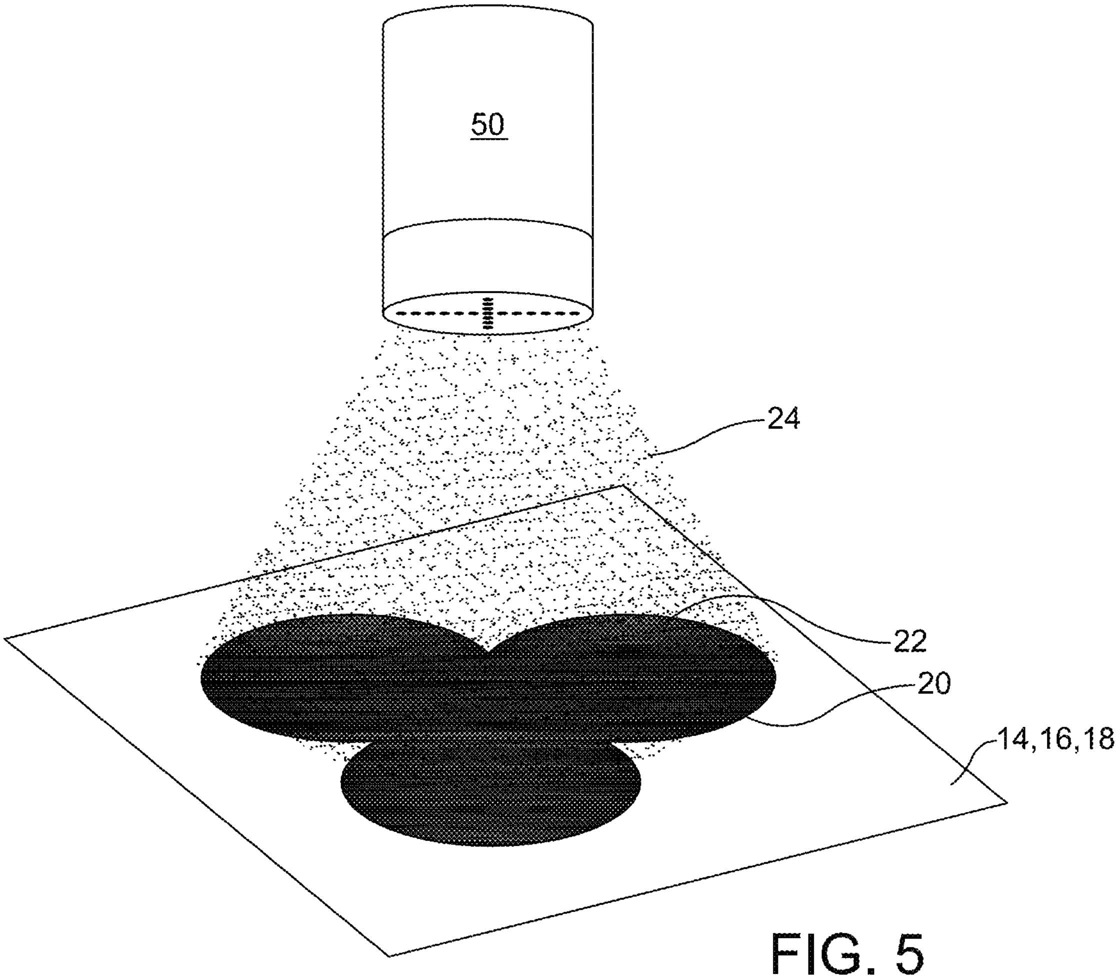

In a fifth step, as shown in FIG. 5, the adhesive layer 24 is applied to the uncured white layer 22. The adhesive layer 24 is applied at a separate station or area than the station or area where the ink layer 20 and the white layer 22 is applied. As such, the carrier film 14 with the ink layer 20 and the white layer 22 can be transferred between the stations. However, it is understood, the adhesive layer 24 can be applied at the same station as the ink layer 20 and the white layer 22. The adhesive layer 24 can be applied by a dispenser 50, for example. The dispenser 50 can be a gravity fed container, a pneumatically fed container, a print head, or any similar type application for example.

Figure 6:
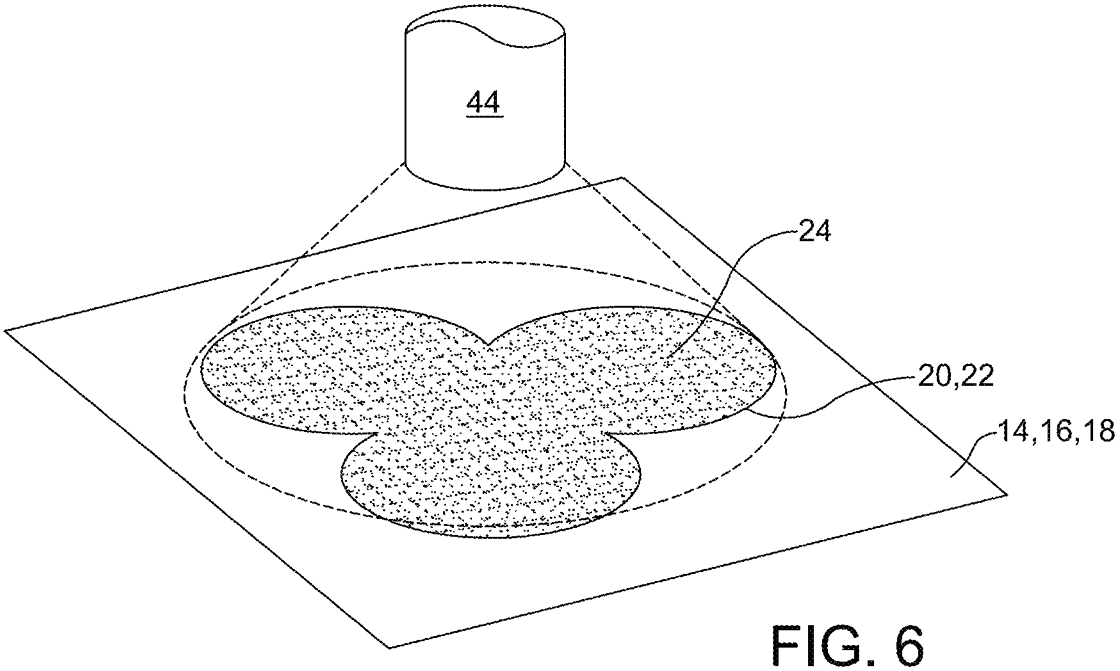

In a sixth step, as shown in FIG. 6, the carrier film 14 is transferred to a heating element 44 to cure the powder forming the adhesive layer 24 to the uncured white layer 22. The carrier film 14 can be transferred from a station for applying the adhesive layer 24 to a station for applying the heating element 44 via a conveyor, robot, or manually for example. Although, it is understood other methods can be employed from transferring the carrier film 14 from one station to another. The heating element 44 can be a dryer, a flash curer, a lighting or ultra violet light, a kiln or oven, or any other type of element to heat and dry the white layer 22. The heating element 44 can be the same heating element as the heating elements 40, 42 or separate therefrom.

Figure 7:
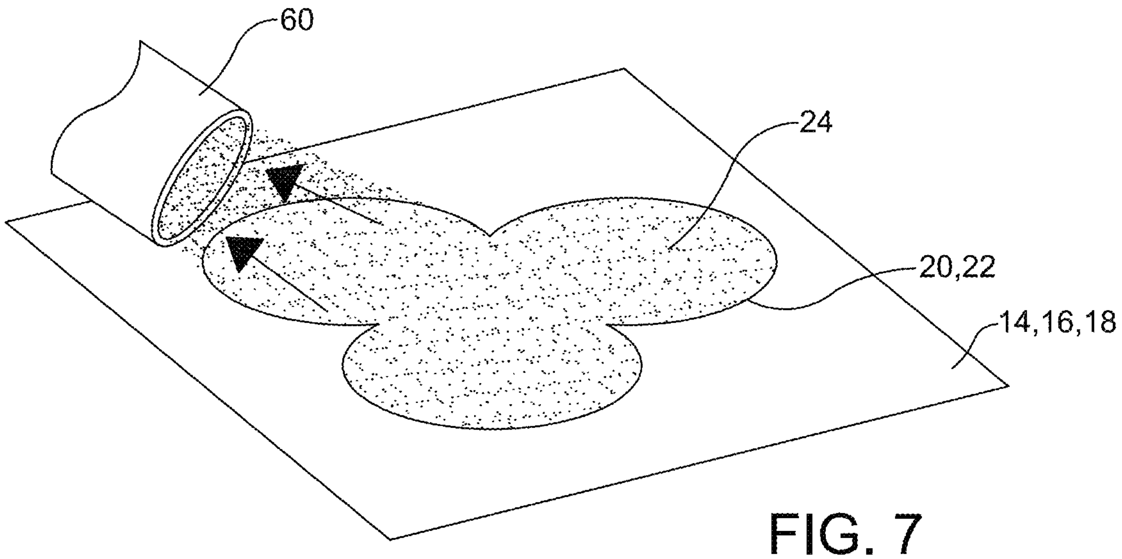

In a seventh step, as shown in FIG. 7, a negative pressure device or a vacuum 60 is employed to remove excess or loose material from the adhesive layer 24. For example, excess powder employed to form the adhesive layer 24 may remain after the curing of the adhesive layer 24. As a result, the vacuum 60 is employed to remove the excess powder. The vacuum 60 can be employed at the same station or area as the application of the adhesive layer 24. However, it is understood the vacuum 60 can be employed at a separate station or area, wherein the carrier film 14 is transferred between the stations via a conveyor, robot, or manually, for example. Once the adhesive layer 24 is cured, the applicator 10 can be applied to the substrate 100. The order of the sixth step and the seventh step can be reversed, wherein the removal of excess material or powder occurs before the curing of the powder forming the adhesive layer 24.

In an eighth step, as shown in FIG. 8, the applicator 10 is applied to the substrate 100. The applicator 10 engages the substrate 100 wherein the adhesive layer 24 is adjacent to the substrate 100 and directly engaging the substrate 100. The carrier film 14 is the outermost ones of the layers 12 when the applicator 10 engages the substrate 100. A heating element 46 is employed to transfer heat to the applicator 10. Upon transfer of heat from the heating element 46 to the applicator 10 and the substrate 100, the adhesive layer 24 adheres to the substrate 100 with the white layer 22, ink layer 20, and lacquer layer 18 adhering to the substrate 100 via the adhesive layer 24. Once the adhesive layer 24 adheres to the substrate 100, the release layer 16 permits the carrier film 14 to be removed from the lacquer layer 18, the ink layer 20, the white layer 22, and the adhesive layer 24. The carrier film 24 can be removed, in a ninth step as shown in FIG. 9, all at once by pulling the carrier film 24 from the lacquer layer 18, the ink layer 20, the white layer 22, and the adhesive layer 24 or by peeling the carrier film 14 away from the lacquer layer 18, the ink layer 20, the white layer 22, and the adhesive layer 24. As a result, the cured ones of the ink layer 20 and the white layer 22 are left attached to the substrate 100. It is understood, the applicator 10 can be transferred from the station or area where the adhesive layer 24 is cured to a station or area where the applicator 10 is applied to the substrate 100 via conveyor, robot, or manually.

The substrate 100 is configured as a material such as a textile. The textile can be a tote bag (as illustrated), a garment, a blanket, or any other piece of material or clothing. The textile can also be any other material such as utensils, packaging, devices, sheets of paper or other material, or any other product needing indicia applied thereto. In application, the substrate 100 can receive the printed indicia in small quantities or in large batches, as desired. A feeding system such as a large roll of the carrier film 14 can be employed to dispense the carrier film 14 to the process to form the applicator 10. Additionally, the substrate 100 can also be fed to the process by a feeding system.

Advantageously, the applicator 10 permits the indicia or image to be 100% transferred from the carrier film 14 to the substrate 100 with photorealistic precision. Increased production efficiency and cost efficiency is realized with the method and process of the present disclosure. Additionally, large batches of the substrates 100 are able to receive the print with minimal downtime.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A process of transferring an indicia to a substrate comprising:

a first conveyor transferring a carrier film, the carrier film including a first layer, a second layer, and a third layer, the first layer is a planar sheet of material, the second layer disposed between the first layer and the second layer and is a pressure sensitive coating, and the third layer is an ultraviolet coating;

a first print head selectively transferring a nonwhite color ink to the carrier film over the third layer to form an ink layer visually displaying the indicia;

a first heating element selectively curing the nonwhite color ink;

a second print head printing a white color ink to the ink layer to form a white layer having a white color ink contour substantially equal to a nonwhite color ink contour of the nonwhite color ink; and a dispenser disposing an adhesive layer on the white layer which is uncured.

2. The process of claim 1, wherein the first print head includes at least one of the colors cyan, magenta, yellow, and black.

3. The process of claim 1, further comprising a second heating element selectively curing the adhesive layer to the white layer.

4. The process of claim 1, wherein the adhesive layer is formed from a powder.

5. The process of claim 4, further comprising a vacuum selectively applying negative pressure to the adhesive layer to remove excess portions of the powder.

6. The process of claim 1, further comprising a third heating element selectively applying heat to the carrier film, the ink layer, the white layer, and the adhesive layer to adhere the ink layer, the white layer, and the adhesive layer to the substrate.

7. A method of transferring an indicia to a substrate comprising the steps of:

providing a carrier film formed from a flexible sheet of material to a conveyor;

transferring ink from a first print head to the carrier film to form an ink layer containing the indicia;

curing the ink with a first heating element;

transferring white ink from a second print head to the ink layer to form a white layer, wherein the white ink is liquid or semi-liquid;

dispensing an adhesive layer on the white ink, the adhesive layer is a powder;

removing excess powder from the adhesive layer by a negative pressure device;

curing the adhesive layer with a second heating element, wherein the carrier film, the ink layer, the white layer, and the adhesive layer form an applicator;

applying the applicator to the substrate with the adhesive layer directly engaging the substrate;

transferring heat to the applicator with a third heating element;

adhering the adhesive layer, the white layer, and the ink layer to the substrate; and removing the carrier film from the ink layer, the white layer, and the adhesive layer.

8. The method of claim 7, further comprising the step of disposing at least one of a release layer and a lacquer layer on the carrier film before forming the ink layer.

9. The method of claim 7, further comprising the step of forming a cured secondary white layer intermediate the ink layer and the white layer formed from the white ink that is a liquid or a semi-liquid.

10. The method of claim 7, wherein the carrier film is a polyester material, the adhesive layer is formed from a powder material, the ink is at least one of cyan, magenta, yellow, and black, and the ink and the white ink is transferred to the carrier film by a print head.

11. The method of claim 7, wherein the first print head transfers ink to the carrier film that is separate from the substrate to form an ink layer containing the indicia.

12. The method of claim 7, further comprising the step of forming a cured secondary white layer disposed directly in contact with the ink layer and the white layer formed from the white ink that is a liquid or a semi-liquid.

13. A process of transferring an indicia to a substrate comprising:

a first print head selectively transferring a nonwhite color ink to a carrier film separate from the substrate to form an ink layer visually displaying the indicia;

a second print head printing a white color ink to the ink layer to form a white layer;

a dispenser disposing an adhesive layer on the white layer, wherein the nonwhite color ink the white color ink, and the adhesive layer have the same contour; and a conveyor transferring the carrier film to each of the first print head, the second print head, and the dispenser, wherein the conveyor, the first print head, the second print head, and the dispenser are configured in a carousel printing machine.

* * * * *